United States Patent [19]

Kubota

[11] Patent Number: 4,638,170

[45] Date of Patent: Jan. 20, 1987

[54] METHOD OF READING BAR CODE

[75] Inventor: Kazufumi Kubota, Kanagawa, Japan

[73] Assignee: Fuji Photo Film Co., Ltd., Kanagawa, Japan

[21] Appl. No.: 712,065

[22] Filed: Mar. 15, 1985

[30] Foreign Application Priority Data

Mar. 16, 1984 [JP] Japan ................................ 59-051757
Mar. 16, 1984 [JP] Japan ................................ 59-051758

[51] Int. Cl.$^4$ .............................................. G06K 7/10
[52] U.S. Cl. ..................................... 250/566; 235/473
[58] Field of Search ............... 250/561, 566, 568, 570; 235/462, 466, 473

[56] References Cited

U.S. PATENT DOCUMENTS 3,794,812  2/1974  Bryant ................................. 235/466
4,025,442  5/1977  Cass ..................................... 250/568
4,514,641  4/1985  Tanaka et al. ....................... 250/557

Primary Examiner—David C. Nelms
Assistant Examiner—Stephone Allen
Attorney, Agent, or Firm—Sughrue, Mion, Zinn, Macpeak, and Seas

[57] ABSTRACT

A method of reading a bar code formed on an object subjected to information detection employs a plurality of light and dark pattern detecting members which are disposed in the bar code reading direction within the widthwise dimension of a single clock bar in the reading direction. The light and dark pattern of one of the clock bars is detected by one of the light and dark pattern members, and the light and dark pattern of another clock bar adjacent to the first-mentioned clock bar is detected by another light and dark pattern detecting member which is located such as to correspond to the second-mentioned clock bar. The detected light and dark patterns are compared with each other, whereby light and dark portions constituting the bar code are discriminated from each other on the basis of relative brightness. Thus, it is possible to prevent the occurrence of a read error in relation to the light and dark portions of the bar code.

21 Claims, 11 Drawing Figures

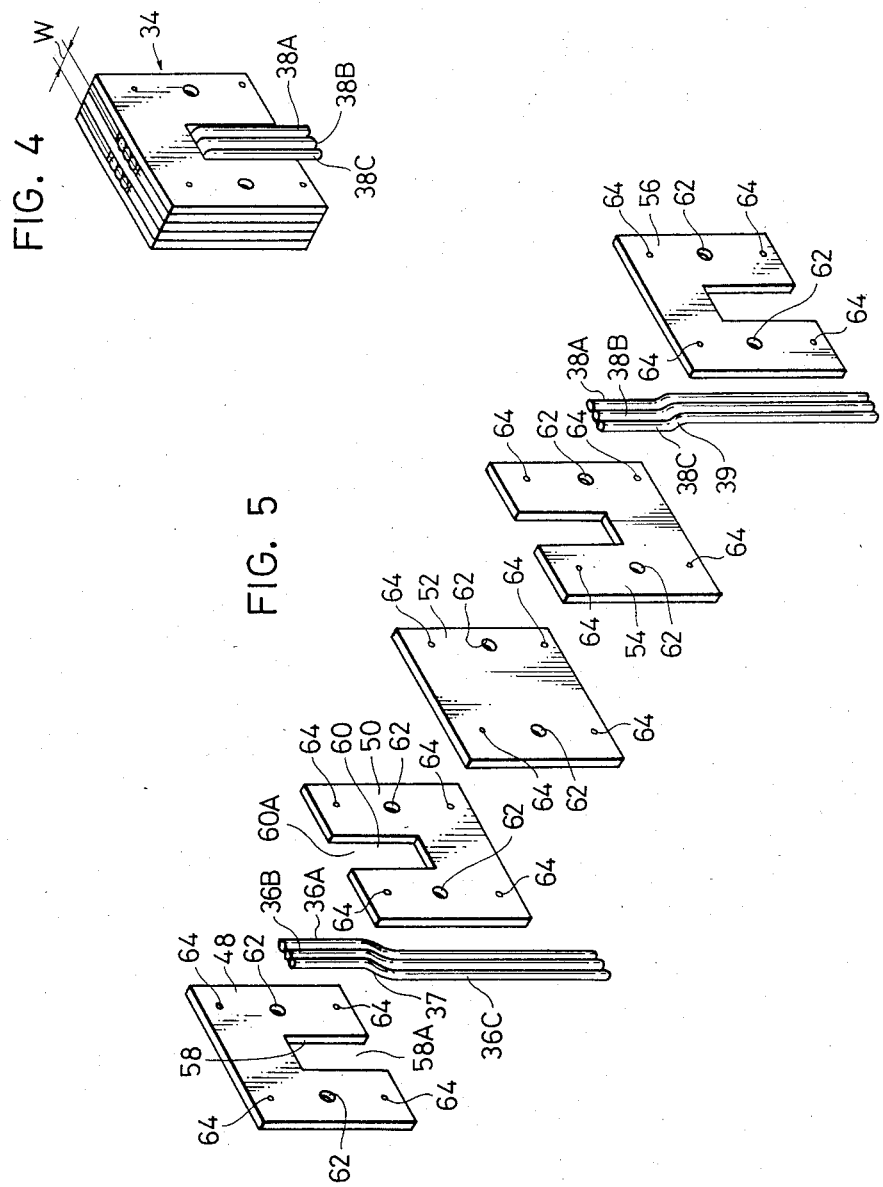

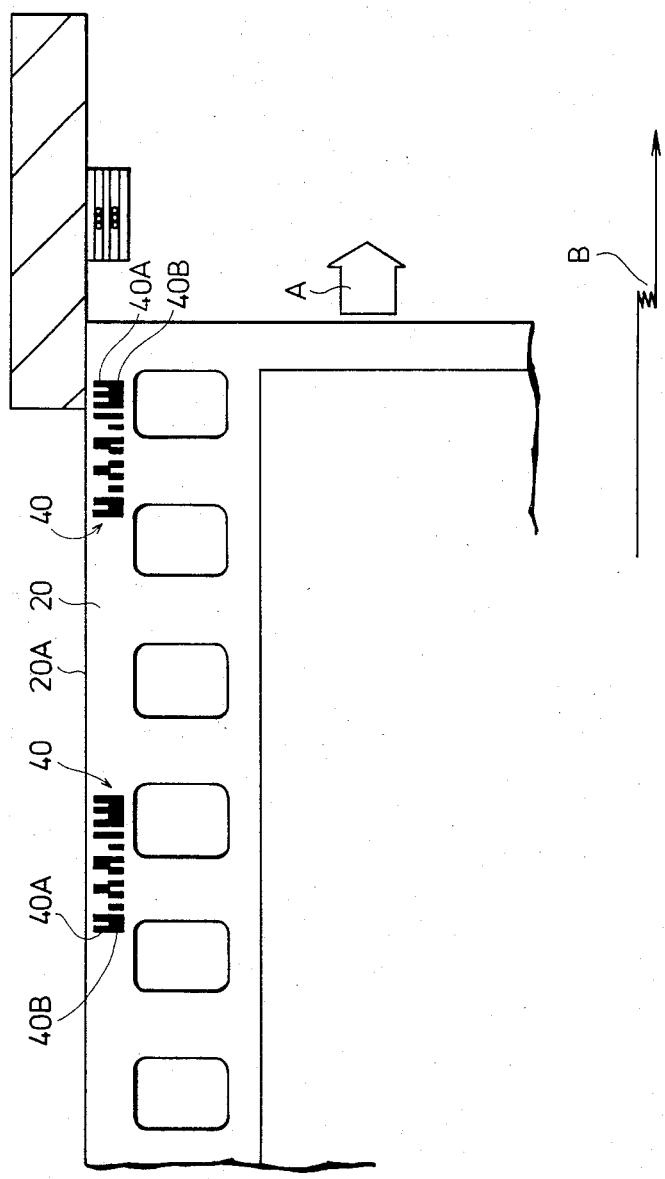

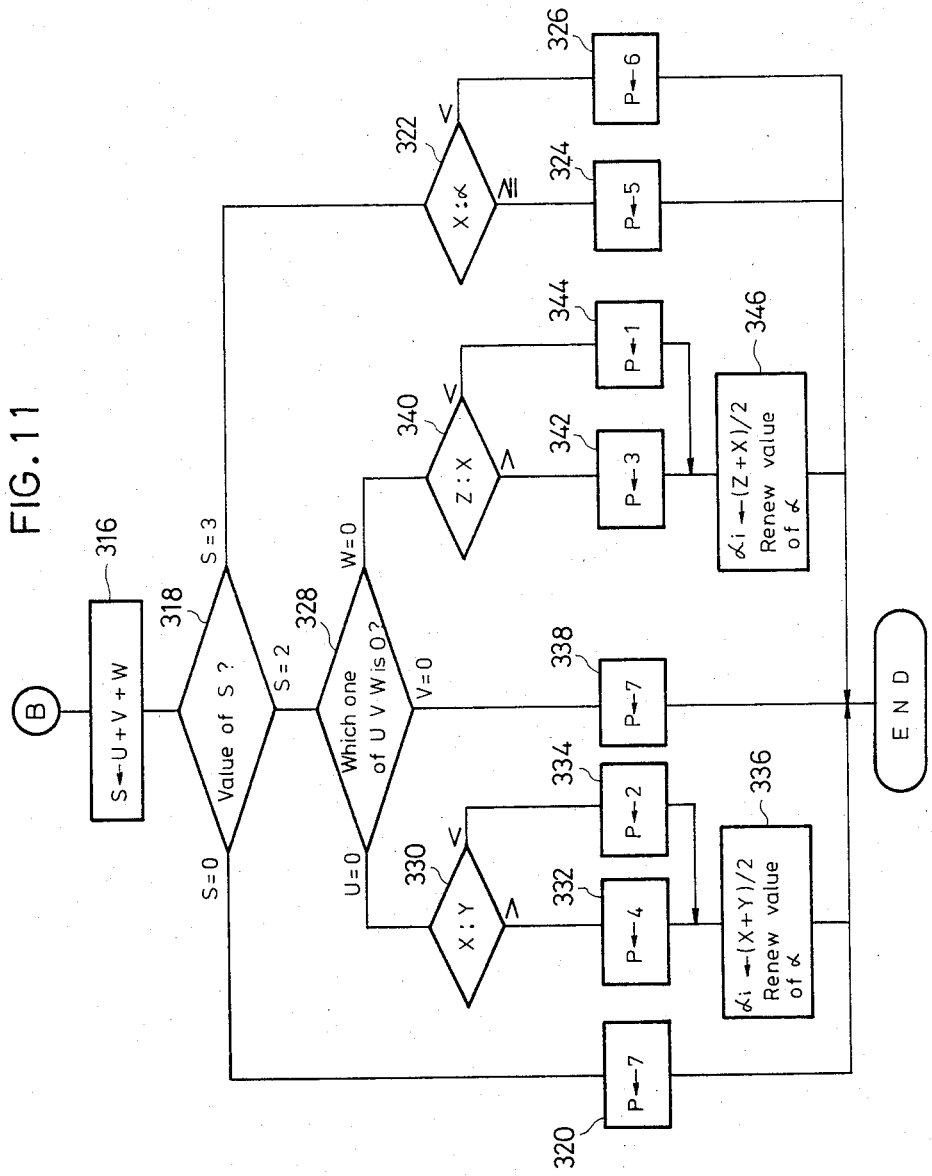

METHOD OF READING BAR CODE

BACKGROUND OF THE INVENTION

1. Field of the Invention

The present invention relates to a method of reading a bar code formed on an object subjected to detection of information, such as a photographic film.

2. Description of the Prior Art

Provision of a bar-code area on a portion of a photographic film makes it possible to record information, such as exposure correction data, which is used when the film is printed.

It is, however, not easy to read the bar code since it is generally formed in a narrow area between one side edge of the film and one of the sprocket-engaging perforations which are formed on both sides of the series of images on the film.

More specifically, the bar code formed on the photographic film consists of two rows of bars respectively serving as a clock track and a data track. The width of each track is about 1 mm, and the minimum distance between adjacent bars is about 0.45 mm in the film advancing direction.

Such an arrangement of the bar code involves the possibility of a read error. More specifically, when the film is intermittently fed, mechanical vibrations may be undesirably generated at the time of starting and stopping the operation of advancing the film, and this fact can easily lead to erroneous double reading of the same data.

Further, various films generally differ from each other in the density of light and dark portions of the bar code, and there are large variations in the density.

The density variations may cause a type of read error that will cause a light portion of the bar code to be erroneously read as a dark portion or vice versa.

SUMMARY OF THE INVENTION

In view of the above-described facts, a primary object of the present invention is to provide a method of reading a bar code which is capable of preventing the occurrence of double-reading errors even when mechanical vibrations are generated and further preventing the generation of a read error in relation to the light and dark portions of the bar code.

To this end, according to the invention, there is provided a method of reading a bar code which employs a photosensor having a plurality of light and dark pattern detecting members disposed in the bar code reading direction within the width of a single clock bar in the reading direction. The type of light and dark pattern detected by the photosensor is discriminated by pattern recognition means. Further, the direction of change of the pattern is judged by clock position decision means, and a judgement is made as to the advancement direction of the bar code relative to the light and dark pattern detecting members, whereby the position of a clock code relative to the detecting members is obtained.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which:

FIG. 4 is a perspective view of a sensor head employed in the bar code reader shown in FIG. 1 (in an inverted state);

FIG. 5 is an exploded perspective view of the sensor head shown in FIG. 4;

FIG. 6 is a sectional view showing the correspondence between bar codes formed on a photographic film and the sensor head;

FIGS. 9 to 11 are flow charts corresponding to a program stored in an ROM incorporated in the circuit shown in FIG. 7.

DESCRIPTION OF THE PREFERRED EMBODIMENT

Figure 1:
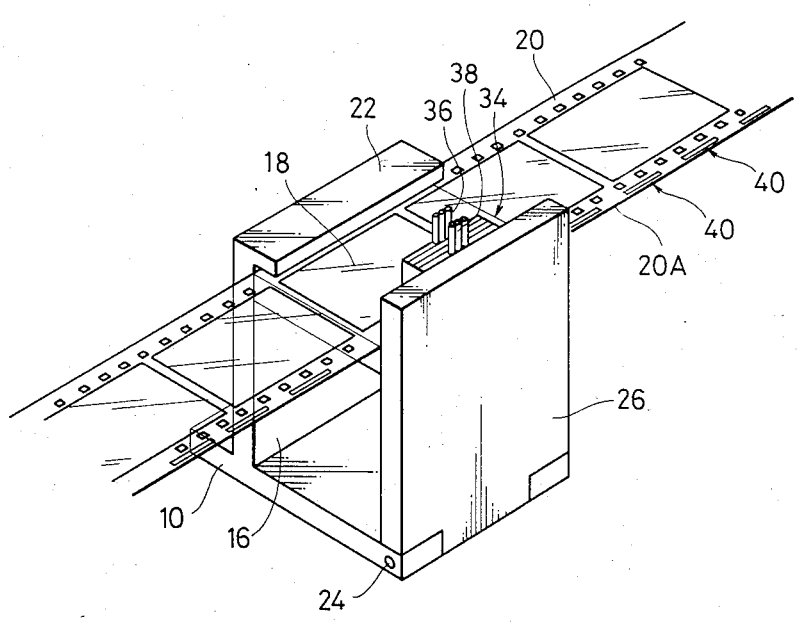
FIG. 1 is a perspective view of the mechanical arrangement of a bar code reader to which one embodiment of the method according to the present invention is applied.
Figure 2:
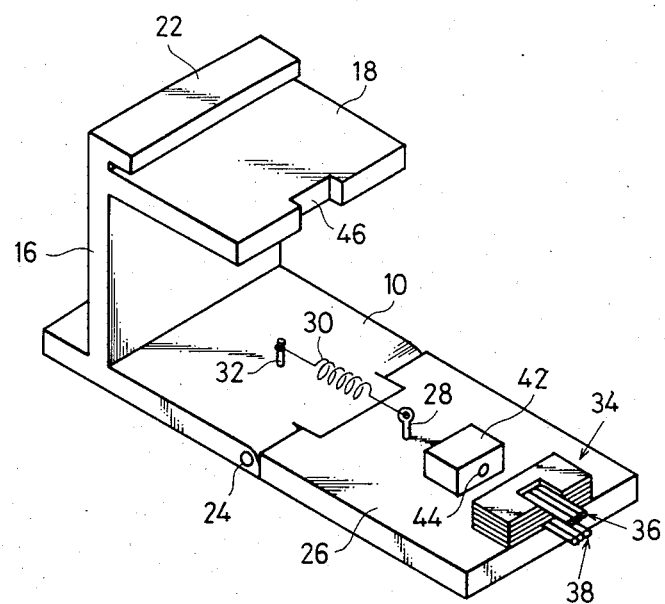
FIG. 2 is an illustration showing the operation of the bar code reader shown in FIG. 1 in a state wherein a movable plate thereof is pivoted.
Figure 3:
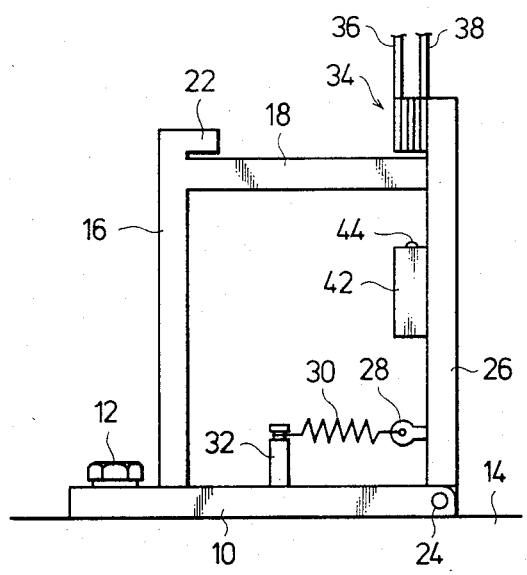
FIG. 3 is a side elevational view of the bar code reader shown in FIG. 1.

FIGS. 1 to 3 in combination show the mechanical arrangement of a bar code reader for a photographic film to which one embodiment of the method according to the present invention is applied.

The bar code reader has a base plate 10 secured to a base 14 by means of bolts 12. A vertical wall 16 is provided on the base plate 10. A mount 18 horizontally projects from a portion of the wall 16 near the upper end thereof. The mount 18 is, as shown in FIG. 1, arranged such that a photographic film 20 moves longitudinally while sliding on the mount 18.

A substantially L-shaped guide plate 22 projects from the joint between the mount 18 and the wall 16 so as to oppose one of the side portions of the photographic film 20 in order to prevent the film 20 from lifting.

A movable plate 26 is pivotally supported at one of the ends thereof by a pin 24 at the distal end of the base plate 10. A spring retainer pin 28 projecting upwardly from the surface of the movable plate 26 retains one of the ends of a tension coil spring 30. The other end of the tension coil spring 30 is retained by a spring retainer pin 32 projecting upwardly from the surface of the base plate 10. Accordingly, the movable plate 26 is biased by the biasing force of the tension coil spring 30 so as to pivot counterclockwise as viewed in FIG. 3. The movable plate 26 is allowed by this biasing force to abut against the side end surface 20A of the photographic film 20 opposite to the guide plate 22. The movable plate 26 further opposes the distal end surface of the mount 18 so as to be prevented from pivoting through more than a predetermined angle. It is to be noted that the dimension of the mount 18 is set such that the side end surface 20A of the photographic film 20 constantly projects slightly beyond the distal end of the mount 18 so as to be able to abut against the movable plate 26.

A sensor head 34 is secured to a portion of the movable plate 26 near the upper end thereof by means of bonding, for example, such that a bundle of optical fibers 36 (36A, 36B, 36C) and a bundle of optical fibers 38 (38A, 38B, 38C) oppose bar codes 40 (see FIG. 6) formed in the vicinity of the side end surface 20A of the photographic film 20. The bar codes 40 are formed within a narrow area between the side end surface 20A of the photographic film 20 and a film-feeding perforation 41 formed therein, at predetermined spacings in the longitudinal direction of the film 20. Each of the bar codes 40 has a data track 40A and a clock track 40B.

Further, a light source 42 is secured to the movable plate 26. The arrangement is such that the light projected from a lens 44 is applied to the photographic film 20 through a window 46 formed in the mount 18, whereby the light and dark portions of each bar code 40 are detected by means of the optical fibers.

The structure of the sensor head 34 and the optical fibers will be described hereinunder in detail. As shown in FIGS. 4 and 5, the sensor head 34 has flat plates 48, 50, 52, 54, 56. Although these flat plates have the same wall thickness in this embodiment, the wall thickness of each of the flat plates may be changed according to need.

The flat plate 48 is formed with a rectangular notch 58 which extends from a portion of a peripheral edge to a central portion of the plate 48 such as to serve as a recess for receiving the optical fibers 36A, 36B, 36C. The flat plate 50 is also formed with a similar notch 60. This notch 60 is, however, disposed such that an opening 58A of the notch 58 and an opening 60A of the notch 60 are opposite to each other, as shown in FIG. 5, when the flat plates 48 and 50 are joined together in layers. By virtue of this arrangement, the notches 58, 60 respectively define optical fiber receiving recesses communicated with each other near the central portion of the joined plates 48, 50, whereby the optical fiber bundle 36 is disposed in these receiving recesses while having a bent portion 37 formed at an intermediate portion thereof.

Similar notches 58, 60 are respectively formed in the flat plates 54, 56 such as to define in combination a continuous optical fiber receiving recess bent at a central portion thereof. Thus, the optical fiber bundle 38 is similarly disposed in the optical fiber receiving recess while having a bent portion 39 formed at an intermediate portion thereof. Each of the flat plates 48, 50, 54, 56 has a wall thickness substantially equal to the diameter of each optical fiber, and each of the notches 58, 60 has a width substantially equal to a value three times as large as the diameter of each optical fiber, thereby allowing each optical fiber bundle to tightly fit in the corresponding optical fiber receiving recess.

Unlike the other flat plates, the flat plate 52 is not provided with a notch but allows the outer peripheral portion of each of the optical fibers disposed within each notch 60 to abut against it. Accordingly, the wall thickness of the flat plate 52 determines the distance W between the respective axes of the optical fiber bundles 36, 38 (see FIG. 4).

The flat plates 48 to 56 are formed with positioning bores 62 and adhesive filling bores 64 which have respective axes perpendicular to the corresponding plate surfaces and are respectively communicated with each other when the plates 48 to 56 are joined together in layers.

The sensor head 34 is assembled according to the following procedure. First, the optical fiber bundle 36 is disposed in the notches 58, 60 of the flat plates 48, 50, while the optical fiber bundle 38 is disposed in the notches 58, 60 of the flat plates 54, 56. Positioning pins, not shown, are respectively inserted into the positioning bores 62 of the flat plates 48 to 56 such as to join the plates 48 to 56 together in layers. Then, an adhesive is injected into the adhesive filling bores 64. Further, another adhesive is injected into the gap between the optical fibers and the bottom surface of each of the recesses defined by the notches 58, 60. After the adhesives have hardened, the positioning pins are removed from the positioning bores 62, whereby the sensor head 34 is completed, as shown in FIG. 4. In this sensor head 34, the distance W between the respective axes of the optical fiber bundles 36, 38 is precisely maintained.

The sensor head 34 is secured to the movable plate 26 by an adhesive or other bonding means, and the distal end portions of the optical fibers are disposed such as to oppose the upper surface of the mount 18 as shown in FIGS. 1, 3, thus completing the assembly of the sensor head 34.

The photographic film 20 is placed on the mount 18 and is intermittently moved in the longitudinal direction (in the direction of the arrow A in FIG. 6). In addition, the light source 42 is energized, and the light projected from the lens 44 is applied to the photographic film 20 through the window 46. Thus, it is possible to read the light and dark portions of each bar code 40 by means of the optical fiber bundles 36, 38.

Since the optical fiber bundles 36, 38 are secured such that the distance W between the axes thereof is precisely maintained, the optical fiber bundles 38, 36 can be precisely positioned such as to be coincident with the data track 40A and the clock track 40B, respectively, of each bar code 40 as shown in FIG. 6.

Even when there is a change in width of the passing photographic film 20, since the movable plate 26 is allowed to abut against the side end surface 20A of the film 20 via the biasing force fo the tension coil spring 30, the sensor head 34 moves while following the side end surface 20A of the film 20, whereby the optical fiber bundles 38, 36 are precisely positioned such as to be coincident with the data track 40A and the clock track 40B, respectively, thereby enabling reading of each bar code 40 without error.

It is to be noted that, when the film 20 is intermittently moved, mechanical vibrations are undesirably generated at the time of starting and stopping the operation of advancing the film 20, whereby the film vibrates in the advancement direction in the manner shown by the reference symbol B in FIG. 6. For this reason, it is necessary to prevent the data represented by the same bar code from being repeatedly read, which could be caused by the mechanical vibrations.

Figure 7:
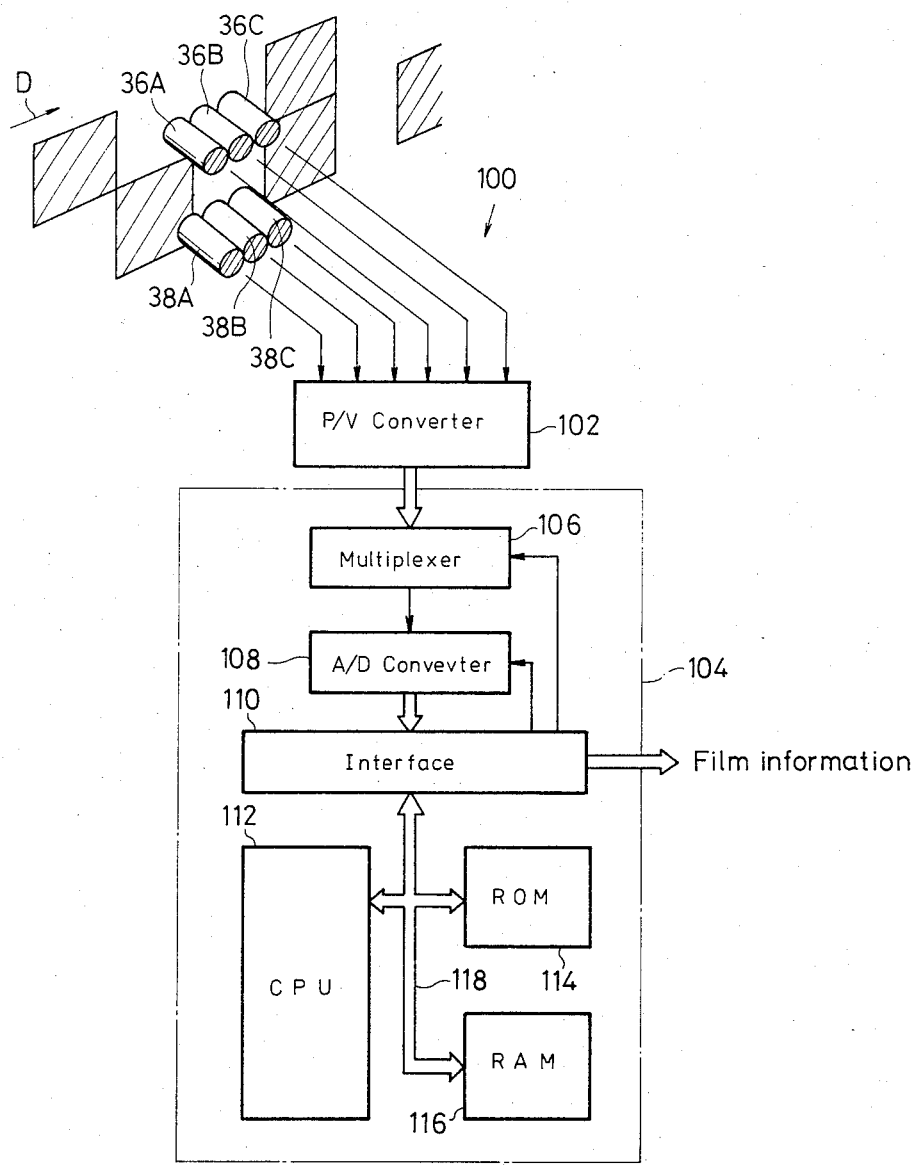
FIG. 7 is a block diagram of a bar code reading and analyzing circuit.

The following is an explanation of a bar code reading and analyzing circuit 100 in accordance with this embodiment with reference to FIG. 7.

The respective output ends of the optical fiber bundles 36, 38 are connected to the corresponding input terminals of a P/V converter 102 which converts quantity into a voltage value. The output terminal of the P/V converter 102 is connected to the input terminal of a multiplexer 106 incorporated in a microcomputer 104.

The multiplexer 106 changes over six analog signals from the P/V converter 102 from one to another and supplies each of the signals to an A/D converter 108. The A/D converter 108 converts the analog signal into a digital signal and supplies the digital signal to an interface 110. A central processing unit (CPU) 112 is connected to a read-only memory (ROM) 114, a random-access memory (RAM) 116 and the interface 110 by a bus 118. The CPU 112 processes bar code signals from the interface 110 according to a program stored in the ROM 114 and outputs film information to an external device (not shown) through the interface 110. It is to be noted that the RAM 116 is employed to provide a work area.

Figure 8:
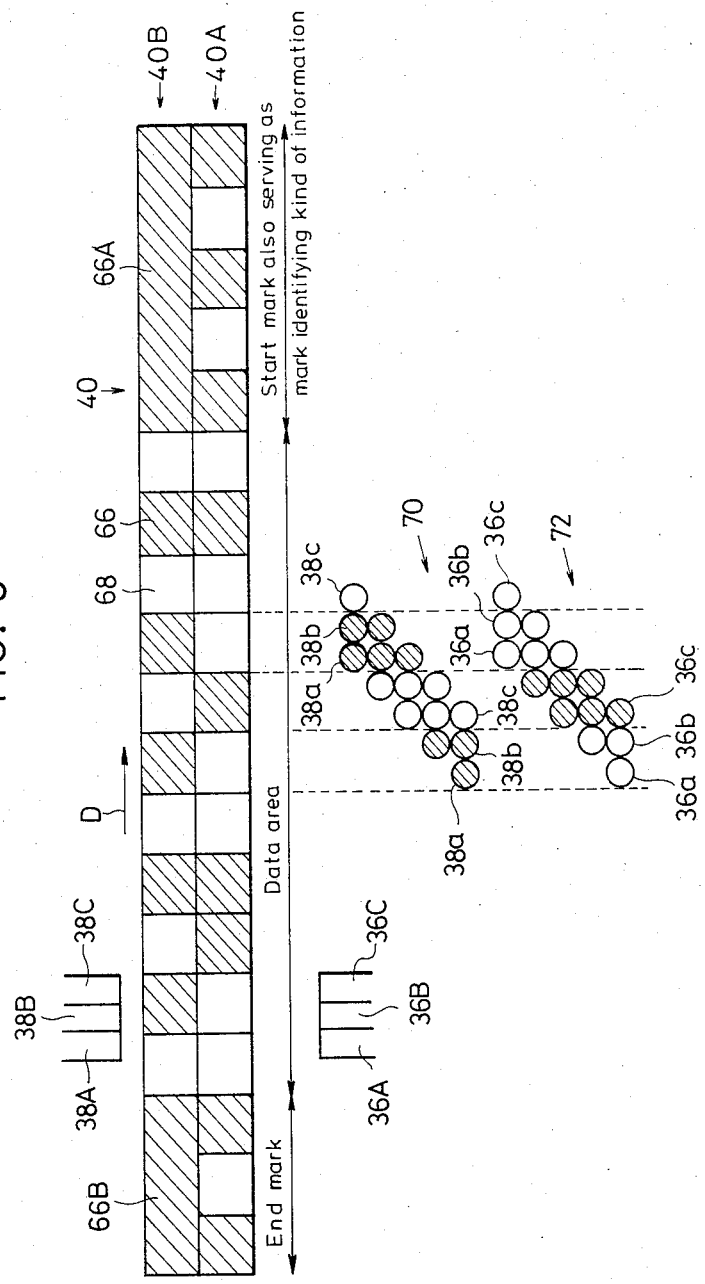
FIG. 8 is an illustration showing how a bar code and the data represented thereby are handled.

Referring next to FIG. 8, the way in which each bar code 40 and the data represented thereby are handled will now be explained. The bar code 40 in FIG. 8 is schematically shown and is framed so that the arrangement thereof can be easily understood.

The bar code 40 consists of dark (black) portions 66 which prevent light from passing therethrough and light (white) portions 69 which allow light to pass therethrough. The clock track 40B has black and white portions alternately arranged thereon. First and last black portions 66A, 66B have relatively large widths in the reading direction (the direction of the arrow D). In this embodiment, the start and the end of each data are discriminated from each other by reading a start mark and an end mark provided on the data track 40A rather than by reading the respective widths of the black portions 66A, 66B (if the arrangement is such that the widths are read for the purpose of the above-described discrimination in terms of the time required for the black portions 66A, 66B to pass, then it becomes necessary to read the traveling speed of the film, which necessitates a more complicated bar code reader). The start mark is also employed to represent the kind of information to be read subsequently. More specifically, if a pattern (black, white and black) on the data track 40A corresponds to a single black portion on the clock track 40B, the pattern is judged to be an end mark. On the other hand, in a case where a pattern on the data track 40A has black and white portions which do not constitute the pattern (black, white and black) and that pattern corresponds to a single black portion on the clock track 40B, said pattern is judged to be a start mark, and the kind of information to be read subsequently is judged from the linear arrangement of the black and white portions thereof.

In the data area, 1-bit data on the data track 40A corresponds to a single black or white portion on the clock track 40B. Accordingly, the data in the data area in FIG. 8 is a set of bits (1, 0, 1, 1, 0, 1, 1, 0, 0, 1, 1).

The judgement as to whether a portion on the clock track 40B is white or black, that is, 1. or 0, is made as follows. When the values of brightness respectively detected by, for example, the optical fibers 38A and 38B in the optical fiber bundle 38 are substantially equal to each other and when these brightness values are larger than the value of brightness detected by the optical fiber 38C, the bit is judged to be 1; when the former brightness values are smaller than the latter brightness value, the bit is judged to be 0. More specifically, the optical fiber bundle 38 includes an optical fiber used for the purpose of reference, and the judgement as to whether a bit is 1 or 0 is made on the basis of relative brightness. Accordingly, even if there are large variations in density among various films, it is possible to accurately read data, without error.

The film feeding direction can be judged by discriminating the direction of change of a pattern of brightness values respectively detected by the optical fibers 38A, 38B. More specifically, as shown in FIG. 8, when a pattern 70 of two black and white circles (38a, 38b) changes in such a manner that (●, ●)→(○, ●), (○, ●)→(○, ○), (○, ○)→(●, ○) or (●, ○)→(●, ●), the film feeding direction is judged to be forward; when the pattern 70 changes in a manner reverse to the above, the film feeding direction is judged to be backward.

As to the data on the data track 40A, a judgement as to whether a bit is 1 or 0 is made by reading a pattern 72 detected by the optical fiber bundle 36 when the above-described pattern read from the clock track 40B is ( , ) or ( , ). The optical fiber bundle 36 includes an optical fiber for reference in a manner similar to that of the optical fiber bundle 38.

Next, flow charts corresponding to the program stored in the ROM 114 in the microcomputer 104 will be described with reference to FIGS. 9 to 11.

Figure 9:
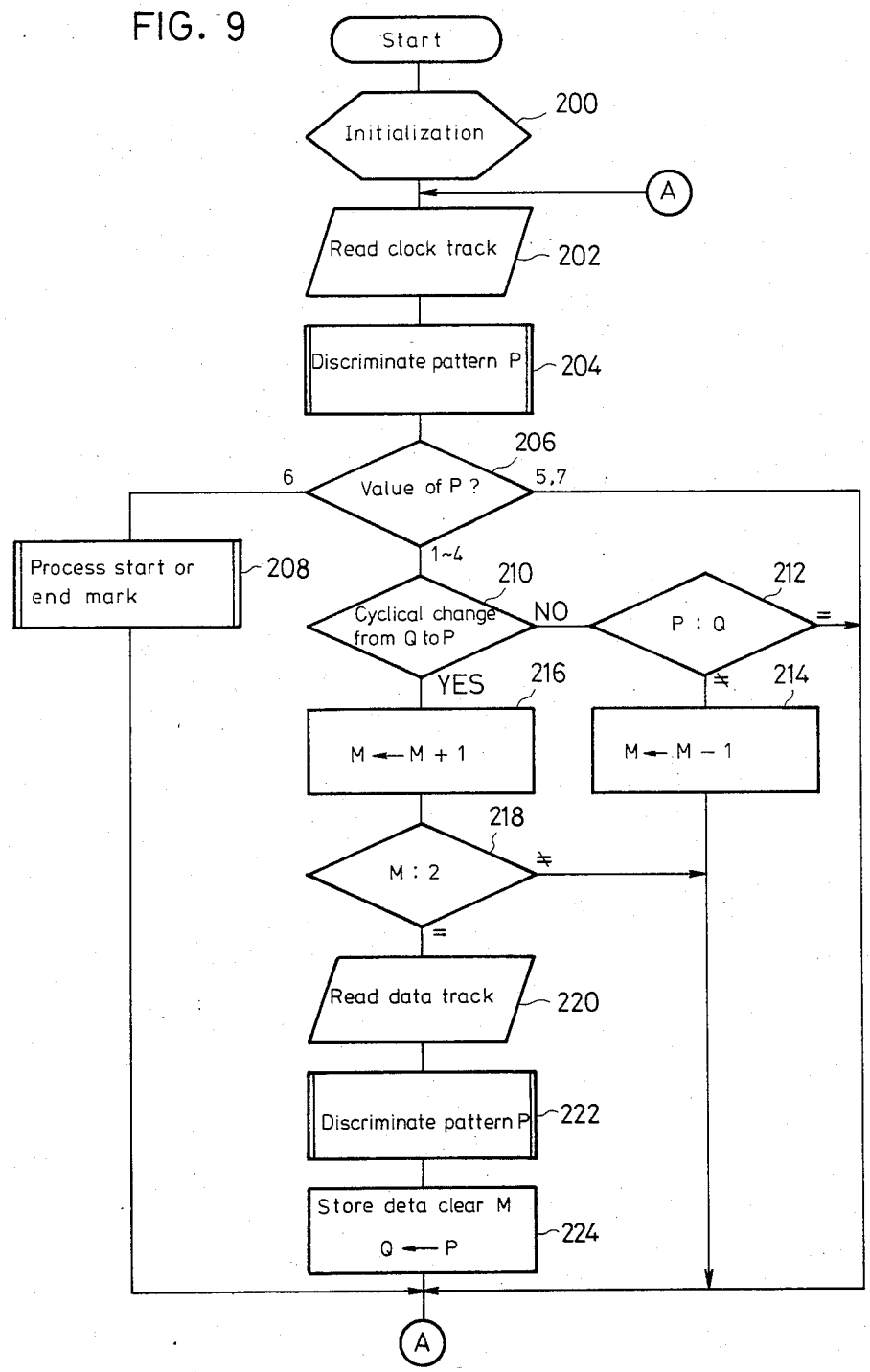
Figure 10:
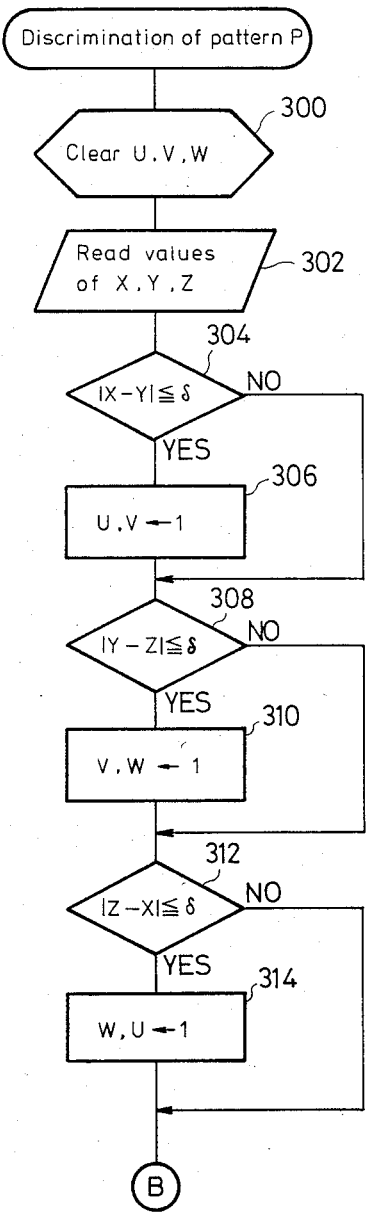

FIG. 9 shows a flow chart of the whole program, while FIGS. 10 and 11 in combination show a flow chart of a pattern P discriminating subroutine which is employed in the process shown in FIG. 9.

In step 200, the data within the work area of the RAM 116 is initialized. Then, in step 202, brightness signals from the optical fiber bundle 38 are read. In step 204, a pattern P is discriminated. In this case, the pattern P represents a value corresponding to a pattern consisting of three light and dark portions. For example, the pattern P is determined as follows:

when ○ ○ ●, P=1; when ● ○ ○, P=2
when ● ● ○, P=3; when ○ ● ●, P=4
when ○ ○ ○, P=5; when ● ● ●, P=6 and when the pattern takes any arrangement other than the above-mentioned, P=7.

Then, in step 206, a branching decision is made in accordance with the value of P.

When P=6, the pattern corresponds to either a start or end mark and, therefore, the process proceeds to step 208, in which processing in relation to the start or end mark is executed. More specifically, if the mark is a start mark, the kind of film information is discriminated and is then stored. One the other hand, if the mark is an end mark, the kind of film information and the data in the data area are output to the external device through the interface 110. Then, initialization is executed in preparation for a subsequent bar code reading operation. The process then returns to the step 202.

When P=5, the pattern represents the fact that a portion in the bar code area in which no bar code exists is being read; when P=7, the optical fiber bundle 36 is in a position on the data track 40A intermediate between bits, that is, a position where the actual pattern is, for example, ◐ ● ◐ or ◐ ○ ◐. Accordingly, when P=5 or 7, the process returns to the step 202.

When P=1 to 4, the process proceeds to a step 210, in which the film feeding direction is determined. The film feeding direction is judged to be forward when the pattern is cyclically changing from Q (the value of P in the preceding reading operation) to P in terms of 1 to 4, that is, 1→2, 2→3, 3→4, or 4→1.

When the pattern is not cyclically changing, the process proceeds to a step 212, in which a judgement as to whether or not P=Q is made. When P=Q, that is, for example, when the feed of the film is at a rest, the process returns to the step 202. When P≠Q, that is, when the film is fed in the backward direction, the process proceeds to a step 214, in which the value of M is decremented, and the process returns to the step 202. The value of M represents how much the film has been fed forwardly or rearwardly from the position of a preceding bit in units of the diameter of a single optical fiber. When M=2, this fact indicates that the film has shifted in such a manner that a subsequent bit confronts the optical fiber bundle 36.

When the pattern is cyclically changing from Q to P, the process proceeds to step 216, in which the value of M is incremented. Then, in step 218, a judgement as to whether or not M=2 is made. When M is not 2, the process returns to the step 202. Accordingly, for example, when M=−5, the data represented by a data code is prevented from being read (in this case, since the data has already been read, it is not necessary to read the same data again) until the film has been advanced from its present position by a distance seven times as long as the diameter of a single optical fiber. Thus, it is possible to prevent the occurrence of a double-reading error.

When M=2, the process proceeds to step 220, in which brightness is detected using the optical fiber bundle 36, thereby reading the data represented by a light or dark portion on the data track 40A. Then, in step 222, the detected brightness pattern P is discriminated according to the pattern P discriminating subroutine. Then, in step 224, a judgement as to whether the bit data is 0 or 1 is made from the value of the pattern P, and the data so determined is stored. Thereafter, the value of M is cleared, and the value of Q is made equal to that of P. Then, the process returns to the step 202, and the above-described process is repeated.

It is to be noted that the arrangement may be such that it is possible to read data irrespective of whether the film is fed in the forward direction or the backward direction. More specifically, in the step 208, when it is judged that the end mark has been read prior to the start mark, the data read subsequently thereto is read into the RAM 116 wherein the bits constituting the data are reversely arranged. After the start mark has been read, the kind of film information and the data within the data area are output to the external device through the interface 110. Then, initialization is executed in preparation for reading a subsequent bar code.

The following is an explanation of the flow chart of the pattern P discriminating subroutine with reference to FIGS. 10 and 11.

In this routine, the brightnesses respectively detected by the optical fibers 36A, 36B and 36C or the optical fibers 38A, 38B and 38C are represented by X, Y and Z, and the magnitudes of X, Y and Z are judged, whereby the value of the above-described pattern P is determined.

First, in step 300, the respective values of U, V and W are cleared, these values representing which of X, Y and Z are substantially coincident with each other. Then, in a step 302, the respective values of the brightnesses X, Y and Z are read. In step 304, a judgement is made as to whether or not the absolute value of the difference between the values of X and Y is below a predetermined value δ, that is, whether or not the respective values of X and Y are substantially coincident with each other. If YES, the process proceeds to step 306, in which the respective values of U and V are made equal to 1. If NO, or after the processing of the step 306 has been completed, the process proceeds to step 308, in which a judgement as to whether or not the respective values of Y and Z are substantially coincident with each other is made in a manner similar to that described above. If YES, the process proceeds to step 310, in which the respective values of V and W are made equal to 1. If NO, or after the processing of the step 310 has been completed, the process proceeds to step 312, in which a judgement as to whether or not the respective values of Z and X are substantially coincident with each other is made in a manner similar to the above. If YES, the process proceeds to a step 314, in which the respective values of W and U are made equal to 1. If NO, or after the processing of the step 314 has been completed, the process proceeds to step 316, in which the respective values of U, V and W are added together, and the result is defined as a value of S. The value of S is either 0, 2 or 3.

Then, in a step 318, a branching decision is made in accordance with the value of S. When S=0, that is, when the difference between the three brightnesses is above δ (e.g., ◐ ○ ◑ ), the value of P is made equal to 7 (in step 320). When S=3, that is, when the difference between the three brightnesses is below δ, the process proceeds to step 322, in which a judgement is made as to whether or not the value of X is above a value α which is employed to distinguish between light and dark. The arrangement is such that the value of α is renewed as will be described later. When X≧α, the value of P is made equal to 5 (in step 324); when X<α, the value of P is made equal to 6 (in step 326).

When S=2, that is, when the respective brightnesses of two among the three brightnesses are substantially coincident with each other, the process proceeds to step 328, in which a branching decision is made in accordance with which one of U, V and W is 0. When U=0, that is, when the respective values of Y and Z are substantially coincident with each other, the process proceeds to step 330, in which the respective values of X and Y are compared with each other. If X>Y, the value of P is made equal to 4 (in step 332); if X<Y, the value of P is made equal to 2 (in step 334). After the processing of either the step 332 or 334 has been completed, in step 336, the value of α is renewed: for example, α=-(αi+αi−1+αi−2) / 3, where: αi represents a mean value of the respective values of X and Y; αi−1 represents the mean value of α in the preceding reading operation; and αi−2 represents the means value of α in the reading operation preceding that last mentioned.

When V=0, that is, when the respective values of X and Z are substantially coincident with each other (e.g., ◐ ● ◐), the value of P is made equal to 7 (in step 338).

When W=0, that is, when the respective values of X and Y are substantially coincident with each other, the respective values of Z and X are compared with each other in step 340. If Z>X, the value of P is made equal to 3 (in step 342); if Z<X, the value of P is made equal to 1 (in step 344). After the processing of either the step 342 or 344 has been completed, the value of α is renewed in a manner similar to the above in a step 346.

When the processing of either the step 320, 324, 326, 336, 338 or 346 has been completed, the processing of the routine concerned is ended.

As has been described, according to the present invention, the respective brightnesses of light and dark portions of a bar code are judged relative to each other by the use of three optical fibers. It is, therefore, possible to accurately read data even if there are variations in the density difference among various bar codes.

It is to be noted that it suffices to provide at least two optical fibers for detecting the brightness of a clock code. Further, it is sufficient to provide at least one optical fiber for detecting the brightness of a data code. Furthermore, in place of the P/V converter 102, the multiplexer 106 and the A/D converter 108, phototransistors may be employed to read light and dark patterns detected by the optical fibers in a direct and digital manner. In this case, the pattern P discriminating routine is advantageously simplified.

What is claimed is:

1. A method of reading a bar code formed on an object subjected to information detection, comprising the steps of:
   (a) detecting the pattern of light and dark portions of said bar code using a detecting means which includes a plurality of pattern detecting members disposed in the bar code reading direction, at least two of said detecting members being confined within the widthwise dimension of a single clock bar of said bar code and being disposed in the bar code reading direction;
   (b) determining the type of light and dark pattern detected by said detecting means; and
   (c) determining the direction of advancement of said bar code relative to said pattern detecting members in accordance with the direction of change of said pattern of light and dark portions, thereby obtaining the position of a clock bar code relative to said detecting members.

2. A method of reading a bar code according to claim 1, wherein signal levels respectively detected by said plurality of detecting members are compared with each other, whereby the light and dark portions constituting said bar code are discriminated from each other on the basis of relative brightness.

3. A method of reading a bar code according to claim 2, wherein the number of said pattern detecting members is three, and said detecting members are disposed in a row in the clock bar reading direction in such a manner that the total dimension of two of said detecting members in the bar code reading direction is equal to the widthwise dimension of a single clock bar in the reading direction.

4. A method of reading a bar code according to claim 3, wherein the types of light and dark patterns include (light, light and dark), (dark, light and light), (dark, dark and light), (light, dark and dark), (light, light and light) and (dark, dark and dark).

5. A method of reading a bar code according to claim 4, wherein the direction of advancement of said bar code relative to said pattern detecting members is judged to be forward when a light and dark pattern detected by two adjacent pattern detecting members has changed in one of the following manners; from (dark, dark) to (light, dark); from (light, dark) to (light, light); from (light, light) to (dark, light); or from (dark, light) to (dark, dark); and wherein the direction of advancement is judged to be backward when said light and dark pattern has changed in a manner reverse to the above.

6. A method of reading a bar code according to claim 5, wherein a counter is incremented every time a light and dark pattern detected by said detecting means makes one change in its arrangement in the forward direction, while said counter is decremented every time said light and dark pattern makes one change in its arrangement in the backward direction, and when the value of said counter is decreased, the data on a data bar track of said bar code is ignored until the value of said counter returns to its initial value.

7. A method of reading a bar code according to claim 1, wherein said bar code includes a start mark and an end mark, and when said end mark is detected prior to said start mark, data detected by said detecting means is rearranged in the reverse direction, whereby correct data is obtained.

8. A method of reading a bar code according to claim 1, wherein said detecting means is fixed, and said object subjected to detection of information is moved relative to said detecting means.

9. A method of reading a bar code according to claim 6, wherein, when a light and dark pattern detected by two adjacent pattern detecting members is (light and light), the bit value is judged to be 1; when said light and dark pattern is (dark and dark), the bit value is judged to be 0.

10. A method of reading a bar code according to claim 3, wherein, with respect to signal levels respectively detected by said three pattern detecting members, when the signal levels respectively detected by two adjacent pattern detecting members are substantially coincident with each other, a judgement is made as to whether or not the difference between those detected signal levels on one hand and the signal level detected by the other pattern detecting member on the other is above a predetermined value, whereby the type of pattern detected is judged to be either (light, light and dark) or (dark, dark and light).

11. A method of reading a bar code formed on an object subjected to information detection, said bar code including a clock bar track and a data bar track, comprising the steps of:
   (a) detecting the pattern of light and dark portions of said bar code through the use of a detecting means which includes a plurality of light and dark pattern detecting members disposed in the bar code reading direction, at least two of said detecting members being confined within the widthwise dimension of a single clock bar in the bar code reading direction;
   (b) determining the type of light and dark pattern detected by said detecting means;
   (c) determining the direction of advancement of said bar code relative to said light and dark pattern detecting members from the direction of change of said pattern of light and dark portions, thereby obtaining the position of a clock bar code relative to said detecting members; and
   (d) reading data on said data bar track in correspondence with said position.

12. A method of reading a bar code according to claim 11, wherein signal levels respectively detected by said plurality of detecting members are compared with each other, whereby the light and dark portions constituting said bar code are discriminated from each other on the basis of relative brightness.

13. A method of reading in bar code according to claim 12, wherein said light and dark pattern detecting members are disposed in groups corresponding to said clock bar track and said data bar track, respectively.

14. A method of reading a bar code according to claim 13, wherein the number of said light and dark pattern detecting members is three for each of said groups, and said detecting members are disposed in a row in the reading direction of both said clock bar track and said data bar track in such a manner that, for each of the groups, the total dimension of two of said detecting members in the bar code reading direction is equal to the widthwise dimension of a single clock bar or a single data bar in the reading direction.

15. A method of reading a bar code according to claim 14, wherein the types of light and dark patterns detected by said light and dark pattern detecting means constituting each of said groups include (light, light and dark), (dark, light and light), (dark, dark and light), (light, dark and dark), (light, light and light) and (dark, dark and dark).

16. A method of reading a bar code according to claim 15, wherein the direction of advancement of said bar code relative to said light and dark pattern detecting members is judged to be forward when a light and dark pattern detected by two adjacent light and dark pattern detecting members of those which correspond to said clock bar track has changed in one of the following manners: from (dark, dark) to (light, dark); from (light, dark) to (light, light); from (light, light) to (dark, light); or from (dark, light) to (dark, dark); and wherein the direction of advancement is judged to be backward when said light and dark pattern has changed in a manner reverse to the above.

17. A method of reading a bar code according to claim 16, wherein a counter is incremented every time a light and dark pattern on said clock bar track makes one change in its arrangement in the forward direction, while said counter is decremented every time said light and dark pattern makes one change in its arrangement in the backward direction, and when the value of said counter is decreased, the data on said data bar track is ignored until the value of said counter returns to its initial value.

18. A method of reading a bar code according to claim 17, wherein said bar code includes a start mark and an end mark, and when said end mark is detected prior to said start mark, data detected by said detecting means is rearranged in the reverse direction, whereby correct data is obtained.

19. A method of reading a bar code according to claim 11, wherein said photosensor is fixed, and said object subjected to information detection is moved relative to said photosensor.

20. A method of reading a bar code according to claim 13, wherein, when a light and dark pattern detected by two adjacent light and dark pattern detecting members in each of said groups is (light and light), the bit value is judged to be 1; when said light and dark pattern is (dark and dark), the bit value is judged to be 0.

21. A method of reading a bar code according to claim 14, wherein, with respect to signal levels respectively detected by the three light and dark pattern detecting members of each of said groups, when the signal levels respectively detected by two adjacent light and dark pattern detecting members are substantially coincident with each other, a judgement is made as to whether or not the difference between those detected signal levels on one hand and the signal level detected by the other light and dark pattern detecting member of the respective group on the other is above a predetermined value, whereby the type of pattern detected is judged to be either (light, light and dark) or (dark, dark and light).

* * * * *